(12) United States Patent
Bates et al.

(10) Patent No.: US 7,430,087 B2
(45) Date of Patent: Sep. 30, 2008

(54) METHOD AND DEVICE FOR SERVO FRAME VELOCITY CALCULATIONS OF A STORAGE MEDIA

(75) Inventors: Allen K. Bates, Tucson, AZ (US); Nils Haustein, Soergenloch (DE); Craig A. Klein, Tucson, AZ (US); Daniel J. Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 196 days.

(21) Appl. No.: 11/470,171

(22) Filed: Sep. 5, 2006

(65) Prior Publication Data

US 2008/0055768 A1 Mar. 6, 2008

(51) Int. Cl.
*G11B 15/46* (2006.01)
(52) U.S. Cl. ............... 360/73.03; 360/73.04; 369/47.38
(58) Field of Classification Search ........................ None
See application file for complete search history.

(56) References Cited

U.S. PATENT DOCUMENTS

| | | | |
|---|---|---|---|
| 4,345,278 A * | 8/1982 | Double ........................... | 360/2 |
| 4,623,790 A | 11/1986 | Stossel | |
| 4,807,164 A | 2/1989 | Onyon | |
| 5,331,399 A | 7/1994 | Tank et al. | |
| 6,034,934 A | 3/2000 | Miyake et al. | |
| 6,185,467 B1 | 2/2001 | Romano et al. | |
| 6,487,033 B1 * | 11/2002 | Heydt et al. .................... | 360/60 |
| 6,798,611 B1 | 9/2004 | Romano et al. | |
| 7,177,114 B1 * | 2/2007 | Bui et al. .................. | 360/77.12 |
| 2008/0074779 A1 * | 3/2008 | Bates et al. .............. | 360/77.12 |

* cited by examiner

*Primary Examiner*—Andrew L. Sniezek
(74) *Attorney, Agent, or Firm*—Rabindramath Dutta; Konrad Raynes & Victor LLP

(57) ABSTRACT

A velocity calculator performs high-order calculations of servo frame velocities of a storage media, particularly tape and disk. The velocity calculator employs a servo frame indexing module for generating a first-order preceding servo frame velocity signal indicative of a first-order calculation of a preceding servo frame velocity including a first-order preceding servo frame error term based on first-order current servo frame velocity signal indicative of a first-order calculation of a current servo frame velocity including a first-order current servo frame error term. The velocity calculator further employs a velocity estimating module for generating a higher-order current servo frame velocity signal indicative of a second or higher order velocity calculation of the current servo frame velocity including a higher-order current servo frame error term based on the first-order preceding servo frame velocity signal and the first-order current servo frame velocity signal.

20 Claims, 8 Drawing Sheets

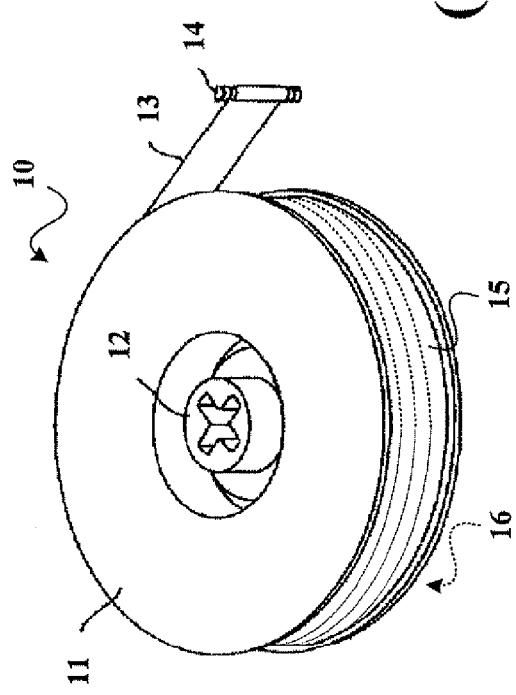
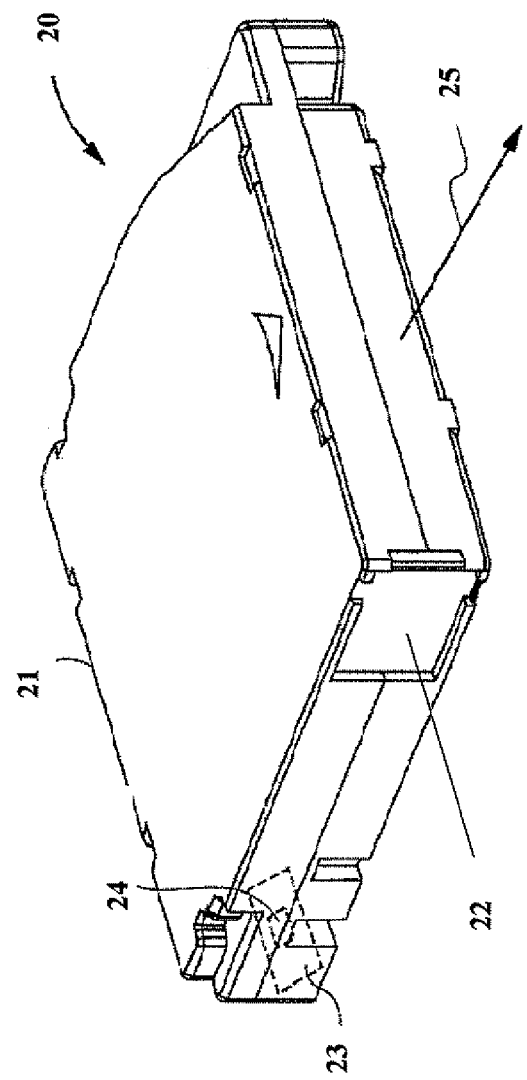
FIG. 1 (PRIOR ART)
FIG. 2 (PRIOR ART)

US 7,430,087 B2

METHOD AND DEVICE FOR SERVO FRAME VELOCITY CALCULATIONS OF A STORAGE MEDIA

FIELD OF THE INVENTION

The present invention generally relates to control information recorded on storage media of any type (e.g., tape and disk). The present invention specifically relates to the use of the control information for purposes of executing a velocity calculation of the storage media.

BACKGROUND OF THE INVENTION

FIGS. 1 and 2 respectively illustrate a tape storage media 10, and a tape storage cartridge 20. Tape storage media 10 is contained with a shell housing 21 of tape storage cartridge 20 that is adapted to interface with a tape drive (not shown).

Specifically, tape cartridge 20 includes exterior cartridge shell 21 and sliding door 22. Sliding door 22 is slid open when tape cartridge 20 is inserted into a tape drive (not shown). Sliding door 22 is normally closed when tape cartridge 20 is not in use, so that debris and contaminants do not enter tape cartridge 20 and degrade tape storage media 10. The direction that tape cartridge 20 is slid into the tape drive is shown as direction 25. Tape cartridge 20 also contains a cartridge memory 24, which is on a printed circuit board 23. Cartridge memory 24 is preferably at a 45° angle, to allow the tape drive and pickers of an automated storage library (not shown) to access the contents of cartridge memory 24.

Tape storage media 10 includes a tape reel 11, which is prevented from rotation by a brake button 12 when tape cartridge 20 is not inserted in the tape drive. The tape drive releases brake button 12 when tape cartridge 20 is inserted into the tape drive, which then allows the free rotation of tape reel 11. Tape reel 11 is wound with tape 15, which is preferably magnetic tape. Alternatively, tape 15 could equally be magneto-optical or optical phase-change tape. On the free end of tape 15 is an optional leader tape 13 and leader pin 14. When tape cartridge 20 is slid into the tape drive, sliding door 22 is opened, and the tape drive threads leader pin 14 and attached leader tape 13 and tape 15 through the tape path. Tape 15 may be a data tape or a cleaner tape. Tape 15 may use the identical formulation of tape for both data and cleaning purposes. The contents of cartridge memory 24 are used to distinguish tape cartridge 20 as either a data cartridge or a cleaner cartridge. Optional leader tape 13 is preferably a thicker section of tape 15 which better withstand the load/unload operations of the tape drive.

Servo tracks 16 are recorded on tape 15 to facilitate an advantageous execution of a servo control of tape 15. FIG. 3 illustrates an exemplary N-pattern timing based servo 30 recordable on tape 15 within servo tracks 16 where servo 30 is shown as having four (4) N-pattern servo frames SF31-SF34. Each servo frame SF31-SF34 sequentially includes from left to right a trailing magnetic forward-slash stripe (/), a middle magnetic backward-slash stripe (\) and a leading magnetic forward-slash stripe (/). A servo element of a tape I/O head (not shown) makes a track 35 across servo frames SF31-SF34 as shown.

A velocity V of tape 15 is important to a reading or a writing of tape 15. Currently, a measurement of the velocity V of tape 15 is on a servo frame by servo frame basis involving a distance between the leading magnetic forward-slash stripe (/) and the trailing magnetic forward-slash stripe (/) of each servo frame divided by a traversal time of the distance between the leading magnetic forward-slash stripe (/) and the trailing magnetic forward-slash stripe (/) of each servo frame.

The following equation [1] is a known first-order velocity calculation for servo frames SF31-SF34:

$$V(j)=[D(j)-D(j-1)]/h+h*D''/2!  \quad [1]$$

where h is a time period between samples, j is a time index representing discrete increments in time, $D(j)-D(j-1)$ is the linear distance across forward-slash stripes of a servo frame at time index j, $D''(j)$ is a second derivative of $D(j)$, and ! is the factorial function. The term $h*D''/2!$ in equation [1] is the error term, and it is a function of h to the first power.

FIG. 4 illustrates an optical storage media 40, which may be Digital Versatile Disk (DVD), High Definition DVD (HD-DVD), Ultra Density Optical (UDO), Blu-Ray, or Holographic media. Optical storage media 40 shows four (4) servo sectors 41-44 and four (4) data sectors 45-48, and FIG. 5 illustrates a banded servo 50 recordable within each servo sector 41-44 where servo 50 is shown as having four (4) servo frames SF51-53 in zone A, and two (2) servo frames SF54 and SF55 in a zone B. An angular velocity ω of media 40 is important to a reading or a writing of media 40. Currently, a measurement of the angular velocity ω of media 40 is on a servo frame by servo frame basis involving an angular distance between ID fields ("IDF") of two adjacent servo frames $\theta(j))-\theta(j-1)$ divided by a traversal time h of the distance between the ID fields of the adjacent servo frames. The following equation [2] is a known first-order velocity calculation for servo frames SF51-SF55:

$$\omega(j)=[\theta(j)-\theta(j-1)]/h+h*\theta''/2! \quad [2]$$

where h is a time period between samples, j is a time index representing discrete increments in time, $\theta(j)$ is a distance across legs of servo frame at time index j, and $\theta''(j)$ is a second derivative of $\theta(j)$; and ! is the factorial function. The term $h*\theta''/2!$ in equation [2] is the error term, and it is a function of h to the first power.

While equations [1] and [2] have proven be beneficial in calculating a velocity of a storage media, the storage media industry is constantly striving to improve the velocity calculations of storage media.

SUMMARY OF THE INVENTION

The present invention provides a new and unique velocity calculation of a storage media of any type that further advances storage media control technology.

One form of the present invention is a velocity calculator for executing high-order calculations of servo frame velocities of a storage media. The velocity calculator comprises a servo frame indexing module and a velocity estimating module. In operation, the servo frame indexing module generates a first-order preceding servo frame velocity signal indicative of a first-order calculation of a preceding servo frame velocity including a first-order preceding servo frame error term based on a first-order current servo frame velocity signal indicative of a first-order calculation of a current servo frame velocity including a first-order current servo frame error term. The velocity estimating module generates a higher-order current servo frame velocity signal indicative of a second or higher order velocity calculation of the current servo frame velocity including a higher-order current servo frame error term based on the first-order preceding servo frame velocity signal and the first-order current servo frame velocity signal.

A second form of the present invention is a velocity calculation method for executing high-order calculations of servo frame velocities of a storage media. The velocity calculation method involves a generation of a first-order preceding servo frame velocity signal indicative of a first-order calculation of a preceding servo frame velocity including a first-order preceding servo frame error term based on a first-order current servo frame velocity signal indicative of a first-order calculation of a current servo frame velocity including a first-order current servo frame error term. The velocity calculation method further involves a generation of a higher-order current servo frame velocity signal indicative of a second or higher order velocity calculation of the current servo frame velocity including a higher-order current servo frame error term based on the first-order preceding servo frame velocity signal and the first-order current servo frame velocity signal.

The aforementioned forms and additional forms as wells as objects and advantages of the present invention will become further apparent from the following detailed description of the various embodiments of the present invention read in conjunction with the accompanying drawings. The detailed description and drawings are merely illustrative of the present invention rather than limiting, the scope of the present invention being defined by the appended claims and equivalents thereof.

BRIEF DESCRIPTION OF THE DRAWINGS

FIG. 1 illustrates an exemplary tape storage media as known in the art;

FIG. 2 illustrates an exemplary tape cartridge as known in the art;

DETAILED DESCRIPTION OF THE PRESENT INVENTION

As related to tape 15 (FIG. 1), the present invention is premised on an increased order of the higher-order error-terms of a calculated servo frame velocity obtained by a Taylor Series expansion and the use of a first order servo frame velocity (e.g., equation [1]). The result is a calculated current servo frame velocity having higher-order error-terms, which means a more accurate assessment of the instantaneous velocity of tape 15 as it moves across the I/O head.

Specifically, a first calculation begin with the following Taylor series equations [3] and [4] with the displacement of tape 15 being calculated for time indices j−1 and j−2:

$$V(j-1) = D(j) - h*D'(j) + h^2*D''(j)/2! - h^3*D'''/3! \quad [3]$$

$$V(j-2) = D(j) - 2h*D'(j) + 4h^2*D''(j)/2! - 8h^3*D'''/3! \quad [4]$$

where h is a time period between samples, j is a time index representing discrete increments in time, D(j) is a distance across the leading and trailing stripes of servo frame N(j) at time index j, D'(j) is a first derivative of D(j), D''(j) is a second derivative of D(j), D''' is a third derivative of D(j), and ! is the factorial function.

By multiplying equation [3] by 4, subtracting the result by equation [4], and then dividing the result by 2 h, the following equation [5] is derived, where the subscript indicates that the error term is of a second-order, $O(h^2)$, in the calculation of the current servo frame velocity $V_{CALC}(j)$ of tape 15 at time index j:

$$V_{CALC}(j) = [3D(j) - 4D(j-1) + D(j-2)]/2h + h^2*D'''/3! \quad [5]$$

Figure 3:
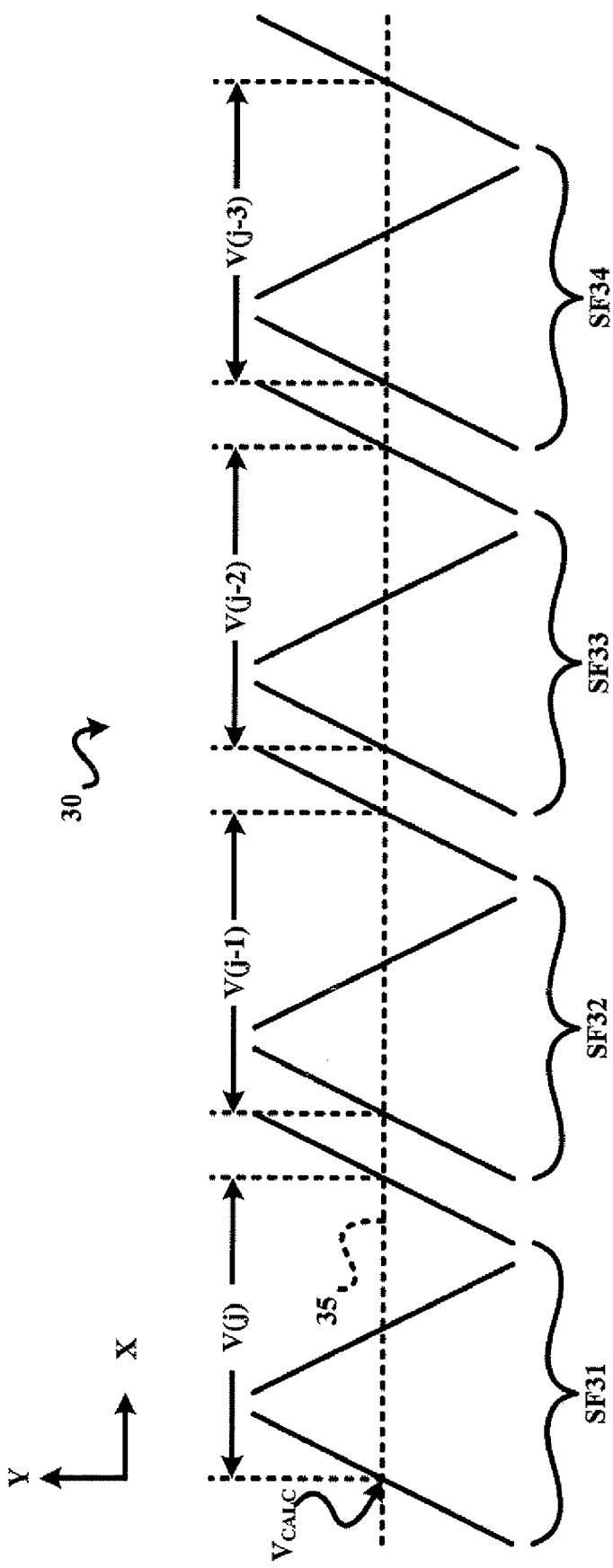
FIG. 3 illustrates a calculated velocity $V_{CALC}(j)$ in accordance with the present invention for an exemplary N-pattern timing based servo of the tape storage media illustrated in FIG. 1.

The inventive step here is that the first-order terms subtract out of the combination of equations [3] and [4]. However, equation [1] can be used to reduce equation [5] into a more practical form and in fact its final form as the following equation [6] (the point of applicability of $V_{CALC}(j)$ is shown in FIG. 3):

$$V_{CALC}(j) = [3V(j) - V(j-1)]/2 + O(h^2) \quad [6]$$

Equation [6] expresses the improved-accuracy calculation of the velocity of tape 15 with error term $O(h^2)$, based on the equation [1] velocity with error term $O(h)$ as calculated at the current time index j, V(j), and the previous time index j−1, V(j−1). The error term in equation [6] is of a second-order in time period h, $O(h^2)$, which is a significant improvement over the standard velocity calculation of equation [1] having an error term of only a first-order in time period h, O(h). In fact, this second-order $O(h^2)$ error term comes about by taking into account any acceleration or deceleration of tape 15 between velocity samples V(j) and V(j−1). The higher the error term (i.e. the exponent of h), the more accurate the calculation of the tape velocity by the servo of the tape drive.

Figure 6:
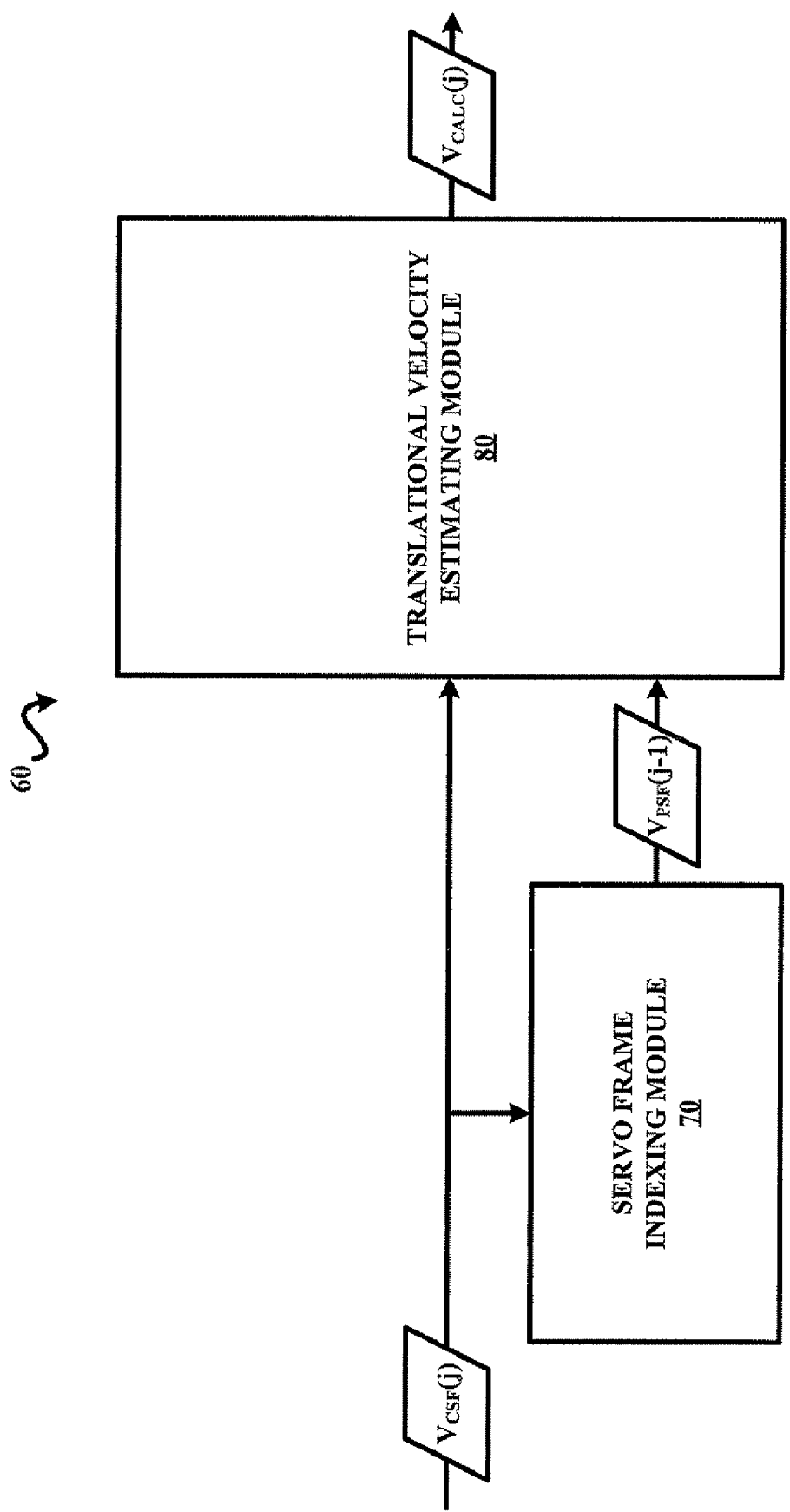
FIG. 6 illustrates a tape storage media embodiment of a velocity calculator $V_{CALC}(j)$ illustrated in FIG. 3 in accordance with the present invention.

FIG. 6 illustrates a velocity calculator 60 for implementing equation [8]. Specifically, velocity calculator 60 employs a servo frame indexing module 70 configured with software, hardware and/or firmware to receive a first-order current servo frame velocity signal $C_{CSF}(j)$ indicative of a first-order calculation of a current servo frame velocity including a first-order current servo frame error term (e.g., equation [1]), and in response thereto, generate a first-order preceding servo frame velocity signal $V_{PSF}(j-1)$ including a first-order preceding servo frame error term based on first-order current servo frame velocity signal $C_{CSF}(j)$. Velocity calculator 60 further employs a translational velocity estimating module 80 configured with software, hardware and/or firmware to receive first-order current servo frame velocity signal $C_{CSF}(j)$ and first-order preceding servo frame velocity signal $V_{PSF}(j-1)$, and in response thereto, generates a higher-order current servo frame velocity $V_{CALC}(j)$ indicative of a higher-order calculation (i.e., second-order or higher) of the current servo frame velocity including a higher-order current servo frame error term based on first-order current servo frame velocity signal $C_{CSF}(j)$ and first-order preceding servo frame velocity signal $V_{PSF}(j-1)$.

Figure 7:
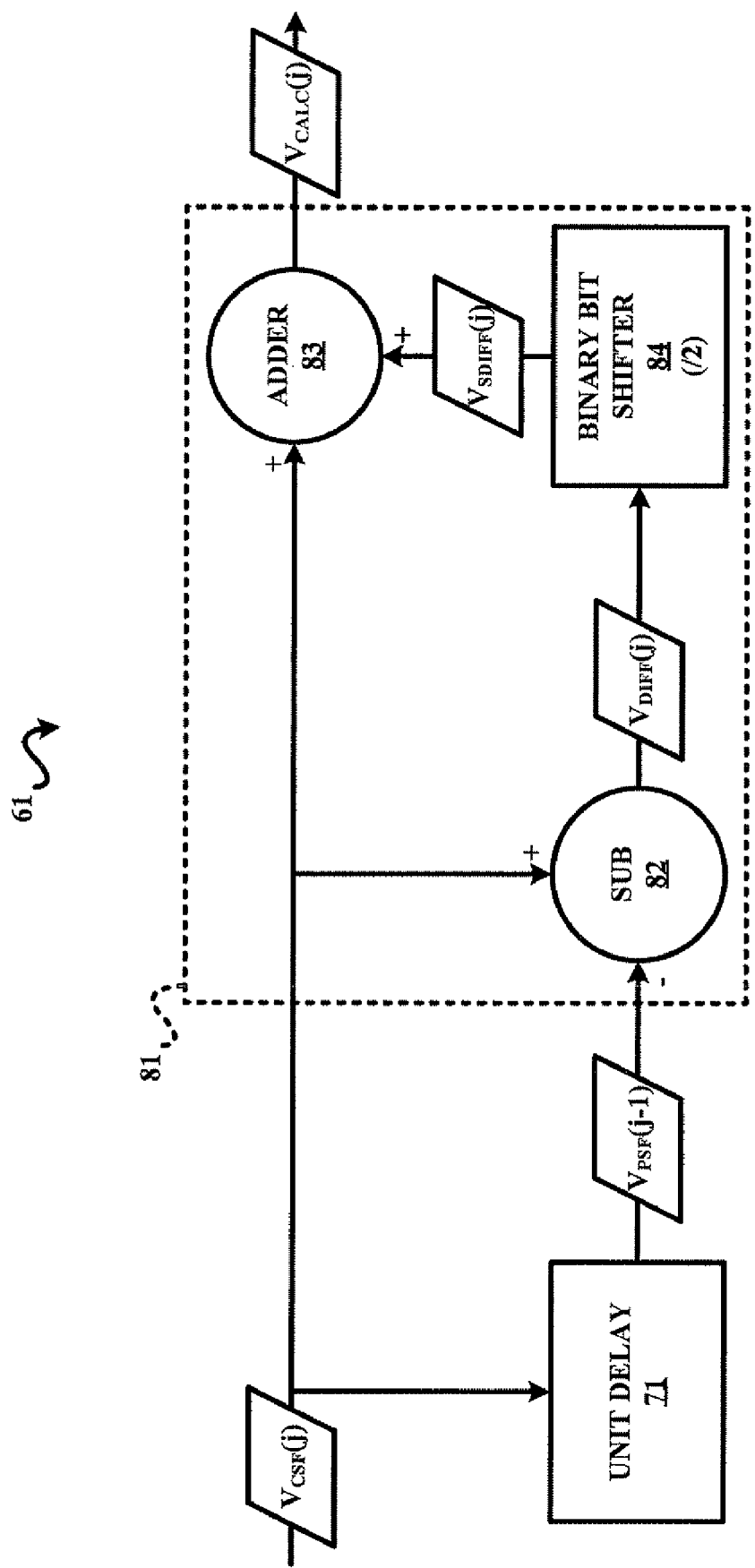
FIG. 7 illustrates an exemplary embodiment of the velocity calculator illustrated in FIG. 6 in accordance with the present invention.

An embodiment 61 of velocity calculator 60 as shown in FIG. 7 represents an exemplary device for implementing equation [6]. Velocity calculator 61 employs a servo frame indexing module in the form of a unit delay 71, which generates first-order preceding servo frame velocity signal $V_{PSF}(j-1)$ by delaying first-order current servo frame velocity signal $C_{CSF}(j)$ by a single time unit.

Velocity calculator 61 further employs a translational velocity estimating module 81 having a subtractor 82, an adder 83 and a binary bit shifter 84. Subtractor 82 receives first-order current servo frame velocity signal $C_{CSF}(j)$ (e.g., V(j) shown in FIG. 3 and used in equation [6]) and first-order preceding servo frame velocity signal $V_{PSF}(j-1)$ (e.g., V(j-1) shown in FIG. 3 and used in equation [6]), and in response thereto, generates a second-order servo frame velocity differential signal $V_{DIFF}(j)$ indicative of a differential between first-order current servo frame velocity signal $C_{CSF}(j)$ and first-order preceding servo frame velocity signal $V_{PSF}(j-1)$. Binary bit shifter 84 receives second-order servo frame velocity differential signal $V_{DIFF}(j)$, and in response thereto, generates a second-order servo frame shifted velocity differential signal $V_{SDIFF}(j)$ indicative of a frame division by 2 of second-order servo frame shifted velocity differential signal $V_{SDIFF}(j)$. Adder 83 receives first-order current servo frame velocity signal $C_{CSF}(j)$ and second-order servo frame shifted velocity differential signal $V_{SDIFF}(j)$, and in response thereto, generates higher-order current servo frame velocity $V_{CALC}(j)$.

In further embodiments, the velocity calculation $V_{CALC}(j)$ of the current servo frame velocity can be accomplished with the following equations [7] and [8], each with increasing higher-order error-terms that would further improve the calculated velocity of tape 15:

$$V_{CALC}(j) = [11V(j) - 7V(j-1) + 2V(j-2)]/6 + O(h^3) \quad [7]$$

$$V_{CALC}(j) = [25V(j) - 23V(j-1) + 13V(j-2) - 3V(j-3)]/12 + O(h^4) \quad [8]$$

Those having ordinary skill in the art will appreciate how to upgrade velocity 61 shown in FIG. 7 for purposes of implementing equation [7] or [8].

Figure 4:
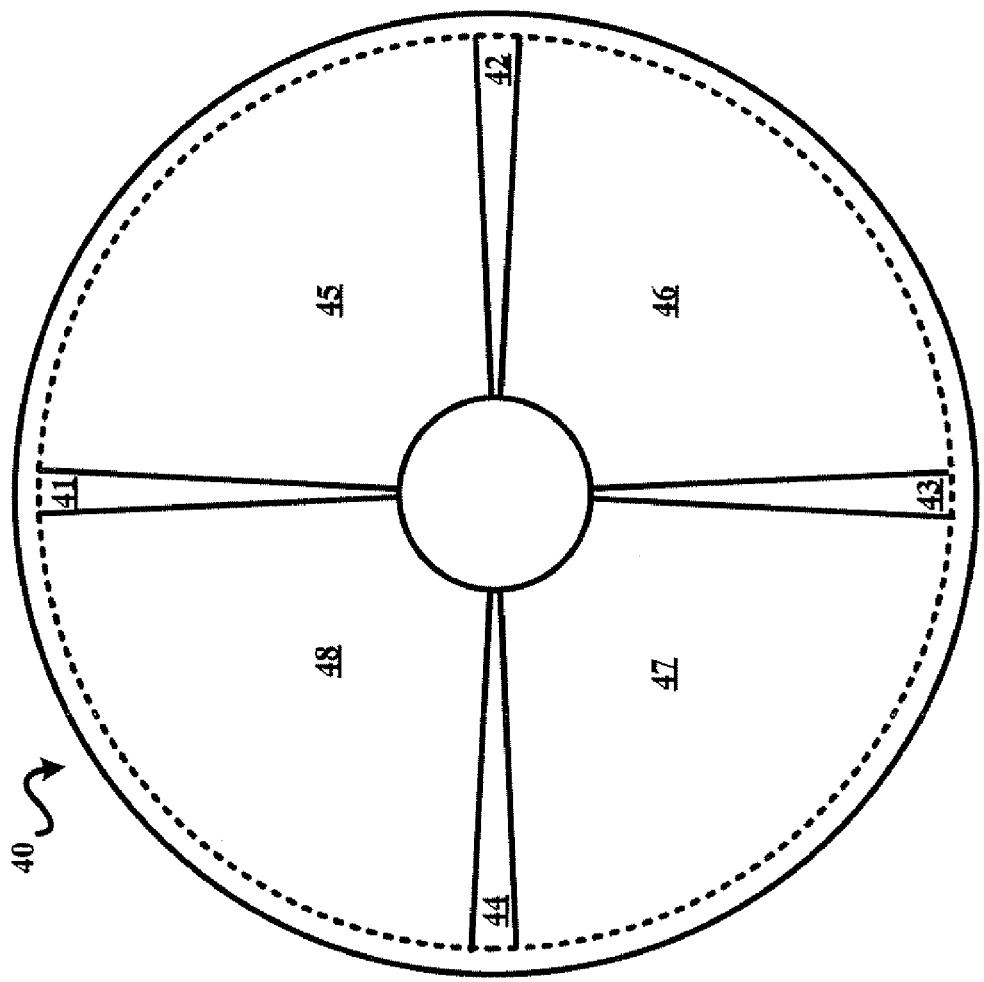
FIG. 4 illustrates an exemplary disk storage media.

As related to disk 40 (FIG. 4), the present invention is premised on an increased order of the higher-order error-terms of a calculated servo frame velocity obtained by a Taylor Series expansion and the use of a first order servo frame velocity (e.g., equation [2]). The result is a calculated current servo frame velocity having higher-order error-terms, which means a more accurate assessment of the instantaneous velocity of disk 40 as it moves across the I/O head.

Specifically, a first calculation begin with the following Taylor series equations [9] and [10] with the displacement of disk 40 being calculated for time indices j–1 and j–2:

$$\omega(j-1) = \theta(j) - h*\theta'(j) + h^2*\theta''(j)/2! - h^3*\theta'''/3! \quad [9]$$

$$\omega(j-2) = \theta(j) - 2h*\theta'(j) + 4h^2*\theta''(j)/2! - 8h^3*\theta'''/3! \quad [10]$$

where h is a time period between samples, j is a time index representing discrete increments in time, $\theta(j) - \theta(j-1)$ is the angle of servo frame N(j) at time index j, $\theta'(j)$ is a first derivative of $\theta(j)$, $\theta''(j)$ is a second derivative of $\theta(j)$, $\theta'''$ is a third derivative of $\theta(j)$, and ! is the factorial function.

By multiplying equation [9] by 4, subtracting the result by equation [10], and then dividing the result by 2 h, the following equation [11] is derived, where the subscript indicates that the error term is of a second-order, $O(h^2)$, in the calculation of the current servo frame velocity $\omega_{CALC}(j)$ of disk 40 at time index j:

$$\omega_{CALC}(j) = [3\theta(j) - 4\theta(j-1) + \theta(j-2)]/2h + h^2*\theta'''/3! \quad [11]$$

The inventive step here is that the first-order terms subtract out of the combination of equations [9] and [10]. However, equation [2] can be used to reduce equation [11] into a more practical form and in fact its final form as the following equation [12]:

$$\omega_{CALC}(j) = [3\omega(j) - \omega(j-1)]/2 + O(h^2) \quad [12]$$

Equation [12] expresses the improved-accuracy calculation of the angular velocity of disk 40 with error term $O(h^2)$, based on the equation [2] velocity with error term O(h) as calculated at the current time index j, $\omega(j)$, and the previous time index j–1, $\omega(j-1)$. The error term in equation [12] is of a second-order in time period h, $O(h^2)$, which is a significant improvement over the standard velocity calculation of equation [2] having an error term of only a first-order in time period h, O(h). In fact, this second-order $O(h^2)$ error term comes about by taking into account any acceleration or deceleration of disk 40 between velocity samples $\omega(j)$ and $\omega(j-1)$. The higher the error term (i.e., the exponent of h), the more accurate the calculation of the disk angular velocity by the servo of the disk drive.

Figure 8:
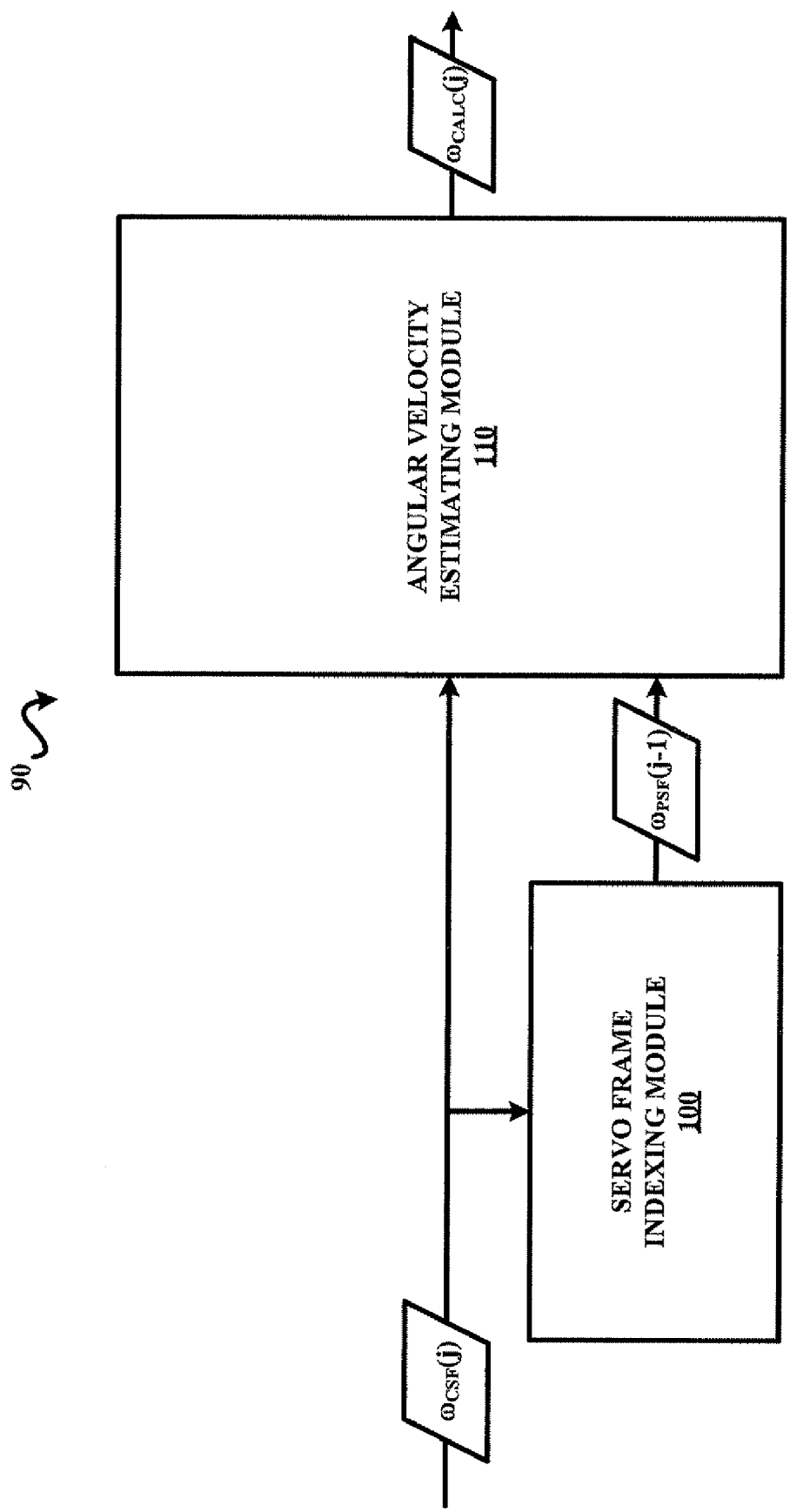
FIG. 8 illustrates a disk storage media embodiment of a velocity calculator $\omega_{CALC}(j)$ illustrated in FIG. 5 in accordance with the present invention.

FIG. 8 illustrates a velocity calculator 90 for implementing equation [12]. Specifically, velocity calculator 90 employs a servo frame indexing module 100 configured with software, hardware and/or firmware to receive a first-order current servo frame velocity signal $\omega_{CSF}(j)$ indicative of a first-order calculation of a current servo frame velocity including a first-order current servo frame error term (e.g., equation [2]), and in response thereto, generate a first-order preceding servo frame velocity signal $\omega_{PSF}(j-1)$ including a first-order preceding servo frame error term based on first-order current servo frame velocity signal $\omega_{CSF}(j)$. Velocity calculator 90 further employs an angular velocity estimating module 110 configured with software, hardware and/or firmware to receive first-order current servo frame velocity signal $\omega_{CSF}(j)$ and first-order preceding servo frame velocity signal $\omega_{PSF}(j-1)$, and in response thereto, to generate a higher-order current servo frame velocity $\omega_{CALC}(j)$ indicative of a higher-order calculation (i.e., second-order or higher) of the current servo frame velocity including a higher-order current servo frame error term based on first-order current servo frame velocity signal $\omega_{CSF}(j)$ and first-order preceding servo frame velocity signal $\omega_{PSF}(j-1)$.

Figure 9:
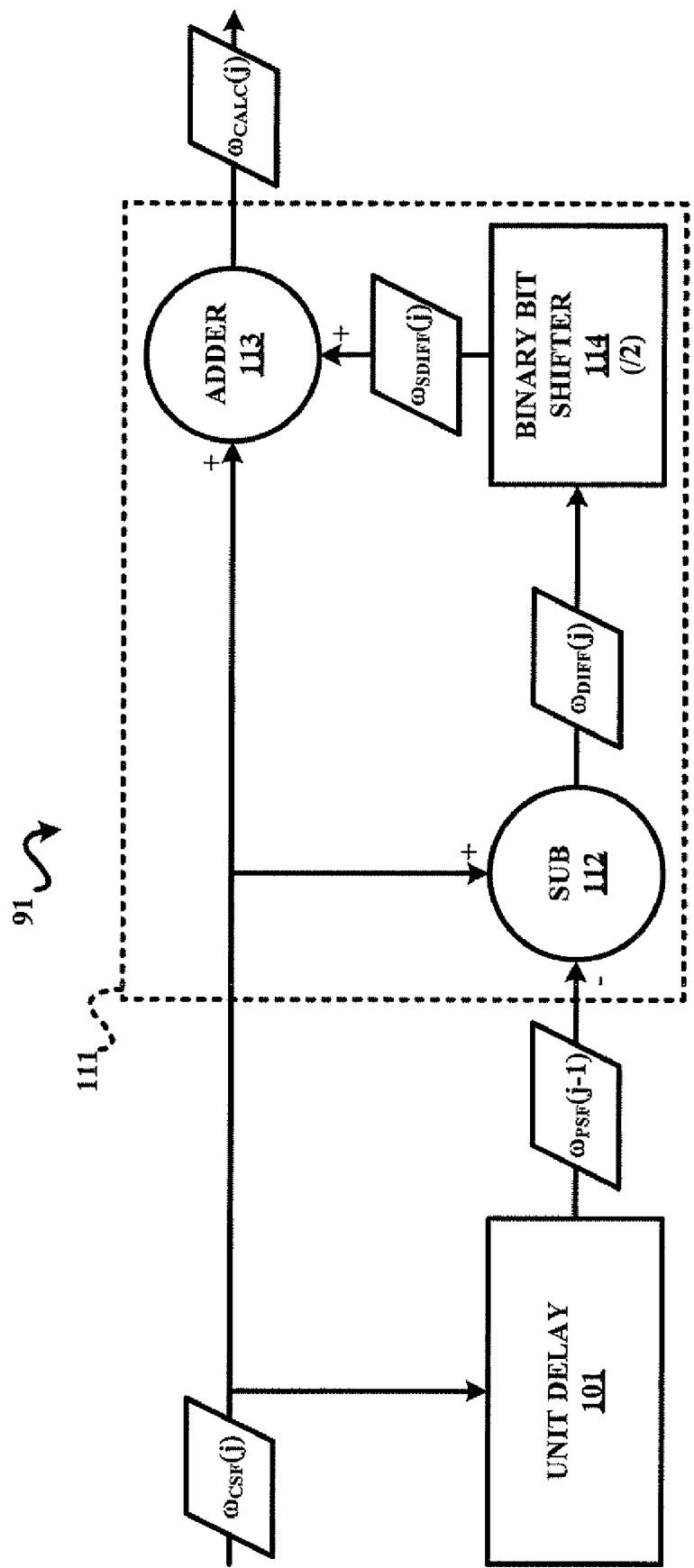
FIG. 9 illustrates an exemplary embodiment of the velocity calculator illustrated in FIG. 8 in accordance with the present invention.

An embodiment 91 of velocity calculator 90 as shown in FIG. 9 represents an exemplary device for implementing equation [14]. Velocity calculator 91 employs a servo frame indexing module in the form of a unit delay 101, which generates first-order preceding servo frame velocity signal $\omega_{PSF}(j-1)$ by delaying first-order current servo frame velocity signal $\omega_{CSF}(j)$ by a single time unit.

Figure 5:
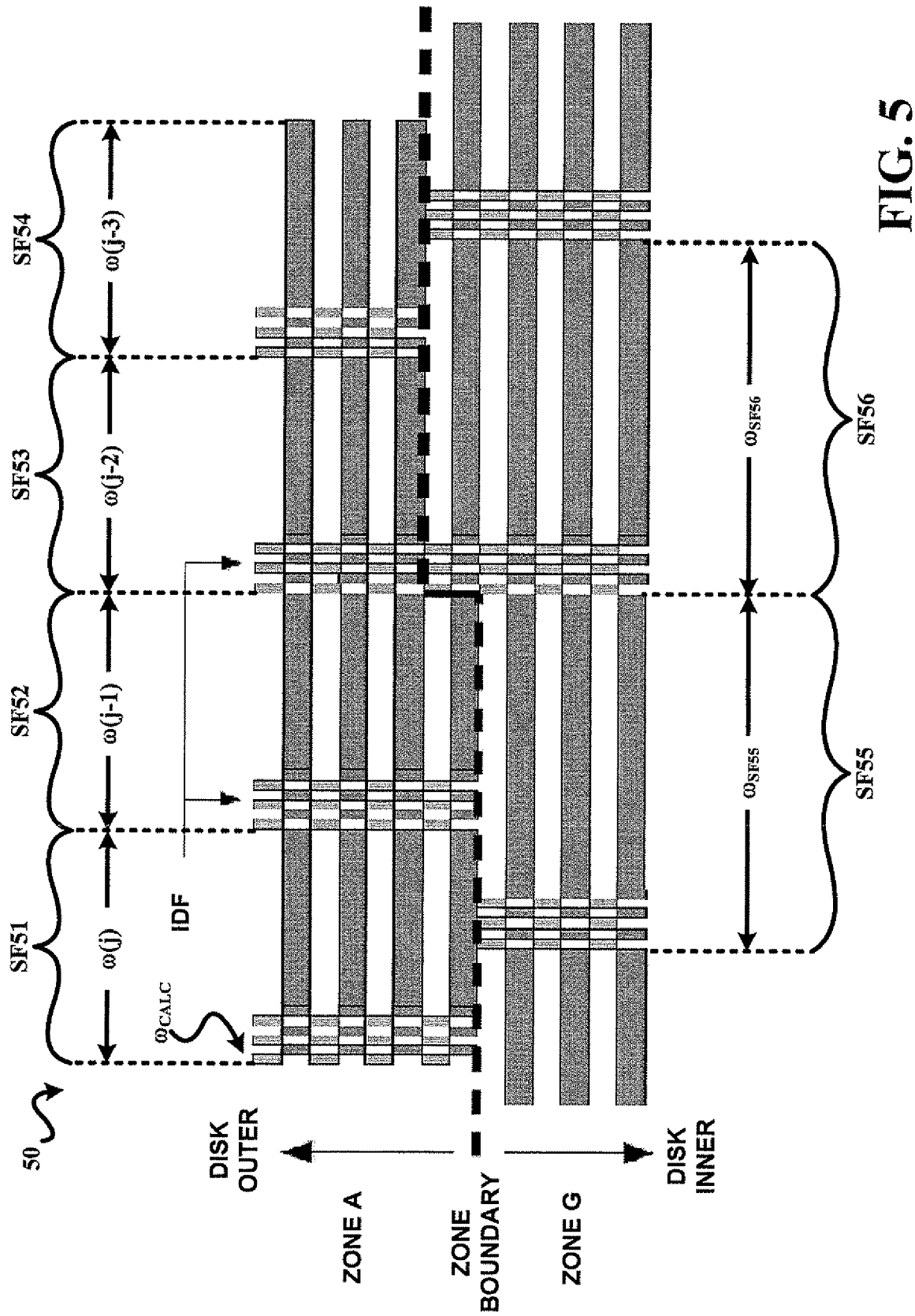
FIG. 5 illustrates a calculated angular velocity $\omega_{CALC}(j)$ in accordance with the present invention for an exemplary optical branded sector of the disk storage media illustrated in FIG. 4.

Velocity calculator 91 further employs an angular velocity estimating module 111 having a subtractor 112, an adder 113 and a binary bit shifter 114. Subtractor 112 receives first-order current servo frame velocity signal $\omega_{CSF}(j)$ and first-order preceding servo frame velocity signal $\omega_{PSF}(j-1)$, and in response thereto, generates a second-order servo frame velocity differential signal $\omega_{DIFF}(j)$ indicative of a differential between first-order current servo frame velocity signal $\omega_{CSF}(j)$ (e.g. COO) shown in FIG. 5 and used in equation [12]) and first-order preceding servo frame velocity signal $\omega_{PSF}(j-1)$ (e.g., $\omega(j-1)$ shown in FIG. 5 and used in equation [12]). Binary bit shifter 114 receives second-order servo frame velocity differential signal $\omega_{DIFF}(j)$, and in response thereto, generates a second-order servo frame shifted velocity differential signal $\omega_{SDIFF}(j)$ indicative of a frame division by 2 of second-order servo frame shifted velocity differential signal $\omega_{SDIFF}(j)$. Adder 113 receives first-order current servo frame velocity signal $\omega_{CSF}(j)$ and second-order servo frame shifted velocity differential signal $\omega_{SDIFF}(j)$, and in response thereto, generates higher-order current servo frame velocity $\omega_{CALC}(j)$.

In further embodiments, the velocity calculation $\omega_{CALC}(j)$ of the current servo frame velocity can be accomplished with the following equations [13] and [14], each with increasing higher-order error-terms that would further improve the calculated angular velocity of disk 40:

$$\omega_{CALC}(j)=[11\omega(j)-7\omega(j-1)+2\omega(j-2)]/6+O(h^3) \quad [13]$$

$$\omega_{CALC}(j)=[25\omega(j)-23\omega(j-1)+13\omega(j-2)-3\omega(j-3)]/12+O(h^4) \quad [14]$$

Those having ordinary skill in the art will appreciate how to upgrade velocity 91 shown in FIG. 9 for purposes of implementing equation [13] or [14].

Those having ordinary skill in the art of storage media velocity calculation techniques may develop other embodiments of the present invention in view of the inventive principles of the present invention described herein. The terms and expression which have been employed in the foregoing specification are used herein as terms of description and not of limitations, and there is no intention in the use of such terms and expressions of excluding equivalents of the features shown and described or portions thereof, it being recognized that the scope of the invention is defined and limited only by the claims which follow.

We claim:

1. A velocity calculator for high-order calculations of servo frame velocities of a storage media, the velocity calculator comprising:
   a servo frame indexing module operable to generate a first-order preceding servo frame velocity signal indicative of a first-order calculation of a preceding servo frame velocity including a first-order preceding servo frame error term based on a first-order current servo frame velocity signal indicative of a first-order calculation of a current servo frame velocity including a first-order current servo frame error term; and
   a velocity estimating module in electrical communication with the servo frame indexing module, wherein the velocity estimating module is operable to generate a higher-order current servo frame velocity signal indicative of at least a second order velocity calculation of the current servo frame velocity including a higher-order current servo frame error term based on the first-order preceding servo frame velocity signal and the first-order current servo frame velocity signal.

2. The velocity calculator of claim 1, wherein the storage media is a tape storage media.

3. The velocity calculator of claim 1, wherein the storage media is a disk storage media.

4. The velocity calculator of claim 1, wherein the servo frame indexing module includes:
   a unit delay operable to generate the first-order preceding servo frame velocity signal as a function of delaying the first-order current servo frame velocity signal by a single time unit.

5. The velocity calculator of claim 1, wherein the velocity estimating module includes:
   a subtractor operable to generate a second order servo frame velocity differential signal indicative of a differential of a first-order current servo frame velocity signal and the first-order preceding servo frame velocity signal.

6. The velocity calculator of claim 5, wherein the velocity estimating module further includes:
   a binary bit shifter in electrical communication with the subtractor, wherein the binary bit shifter is operable to generate a second order shifted servo frame velocity differential signal indicative of a binary bit shift of the second order servo frame velocity differential signal.

7. The velocity calculator of claim 6, wherein the velocity estimating module further includes:
   an adder in electrical communication with the binary bit shifter, wherein the adder is operable to generate the higher-order current servo frame velocity signal indicative of a summation of the first-order current servo frame velocity signal and the second order shifted servo frame velocity differential signal.

8. The velocity calculator of claim 1, wherein the at least one second order velocity calculation of the current servo frame velocity is a function of a differential between the first-order preceding servo frame velocity signal and the first-order current servo frame velocity signal.

9. The velocity calculator of claim 1, wherein the at least one second order velocity calculation of the current servo frame velocity is further a function of a frame division of a differential between the first-order preceding servo frame velocity signal and the first-order current servo frame velocity signal.

10. The velocity calculator of claim 1, wherein the higher-order current servo frame error term is indicative of a velocity change of the storage media between the preceding servo frame and the current servo frame.

11. A velocity method for high-order calculations of servo frame velocities of a storage media, the velocity method comprising:
    generating a first-order preceding servo frame velocity signal indicative of a first-order calculation of a preceding servo frame velocity including a first-order preceding servo frame error term based on a first-order current servo frame velocity indicative of a first-order calculation of a current servo frame velocity including a first-order current servo frame error term; and
    generating a higher-order current servo frame velocity signal indicative of at least a second order velocity calculation of the current servo frame velocity of the current servo frame including a higher-order current servo frame error term based on the first-order preceding servo frame velocity signal and the first-order current servo frame velocity signal.

12. The velocity method of claim 11, wherein the storage media is a tape storage media.

13. The velocity method of claim 11, wherein the storage media is disk storage media.

14. The velocity method of claim 11, wherein the generation of the first-order preceding servo frame velocity signal includes:
    delaying the first-order current servo frame velocity signal by a single time unit.

15. The velocity method of claim 11, wherein the generation of the higher-order current servo frame velocity signal includes:
    generating a second order servo frame velocity differential signal as a function of a differential of the first-order current servo frame velocity signal and the first-order preceding servo frame velocity signal.

16. The velocity method of claim 15, wherein the generation of the higher-order current servo frame velocity signal further includes:
    generating a second order shifted servo frame velocity differential signal as a function of a binary bit shift of the second order servo frame velocity differential signal.

17. The velocity method of claim 16, wherein the generation of the higher-order current servo frame velocity signal further includes:
    generating the higher-order current servo frame velocity signal as a function of a summation of the first-order current servo frame velocity signal and the second order shifted servo frame velocity differential signal.

18. The velocity method of claim 11, wherein the at least one second order velocity calculation of the current servo frame velocity is a function of a differential between the first-order preceding servo frame velocity signal and the first-order current servo frame velocity signal.

19. The velocity method of claim 11, wherein the at least one second order velocity calculation of the current servo frame velocity is a function of a frame division of a differential between the first-order preceding servo frame velocity signal and the first-order current servo frame velocity signal.

20. The velocity method of claim 11, wherein the higher-order current servo frame error term is indicative of a velocity change of the storage media between the preceding servo frame and the current servo frame.

* * * * *